United States Patent
Deplante

[15] 3,680,435
[45] Aug. 1, 1972

[54] ADAPTERS FOR MILLING-CUTTERS AND SIMILAR TOOLS

[72] Inventor: Henri Deplante, Paris, France
[73] Assignee: Avions Marcel Dassault, Vaucresson, France
[22] Filed: Dec. 29, 1970
[21] Appl. No.: 102,455

[30] Foreign Application Priority Data

Dec. 30, 1969 France..........................6945421

[52] U.S. Cl.................90/11 D, 279/1 A, 408/239 A
[51] Int. Cl..............................................B23c 9/00
[58] Field of Search.......90/11 D; 279/1 A, 1 TS, 44, 279/45, 9 A, 9 R, 202–203; 408/239 A

[56] References Cited

UNITED STATES PATENTS 3,168,322  2/1965  Dziedzic......................279/1 TS
3,372,951  3/1968  McCash....................408/239 A Primary Examiner—Gerald A. Dost
Attorney—William J. Daniel

[57] ABSTRACT

An adapter for tools of the milling-cutter type having a shank portion, comprising a shank-receiving hollow case containing a removable part of adjustable length and a separate stop member against which the shank is fetched into abutment, and intermediate drive means having gearwheels and dual racks for automatically clamping and accurately positioning the tool responsively to a pulling force exerted at the end opposite the tool shank receiving orifice.

6 Claims, 6 Drawing Figures

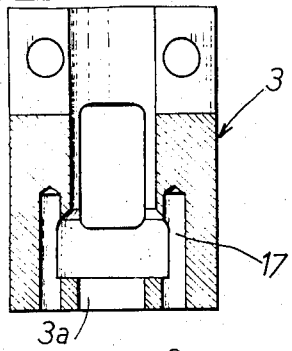
FIG.:2
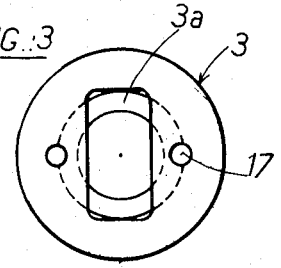
FIG.:3
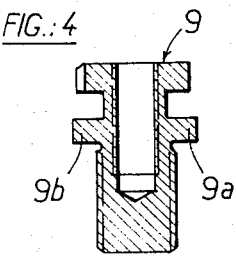
FIG.:4
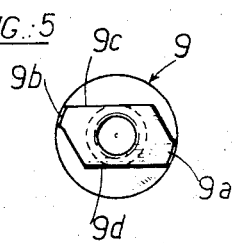
FIG.:5
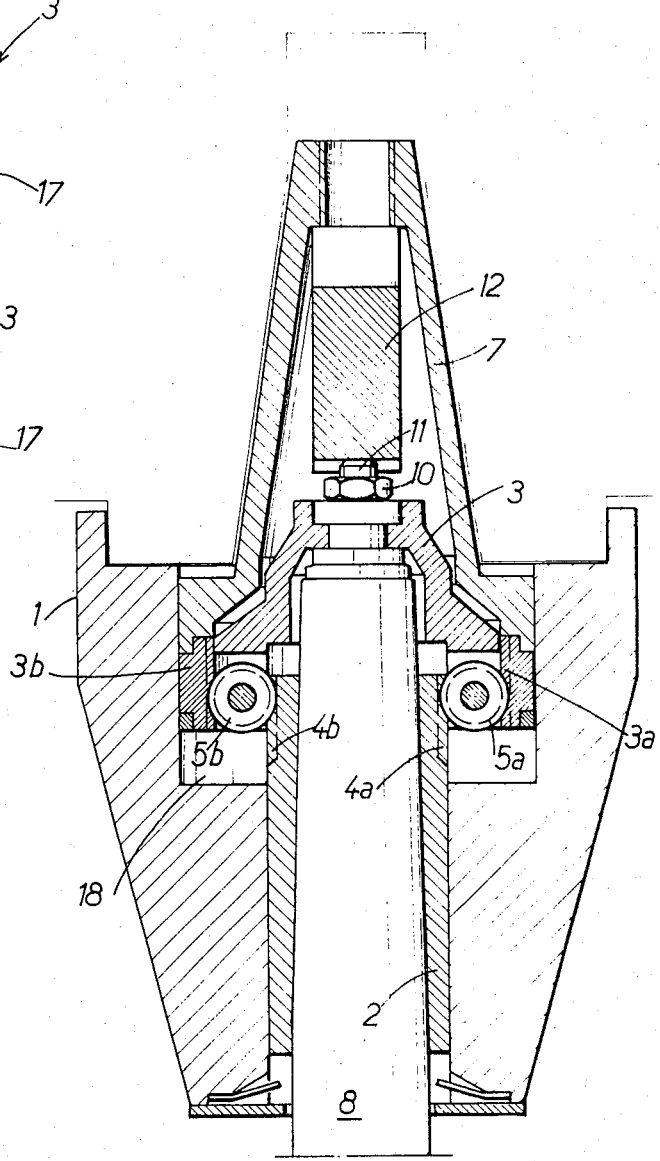
FIG.:6

ADAPTERS FOR MILLING-CUTTERS AND SIMILAR TOOLS

This invention, which comes under the domain of milling, relates more particularly to an adapter for milling-cutters and like tools, that is to say to a part intermediate between the drive shaft and the tool which is to operate on the workpiece. It is of course necessary to be able to adjust the height of the tool in relation to the workpiece, and this requirement is even stricter in the case of machines equipped with digital control, that is to say that the tolerance on tool positioning in relation to the workpiece must be very narrow.

Further, the adapter must permit rapid fitting of the tool when the latter is to be replaced.

More particularly still, the adapter must permit the fitting, of a tool or other mechanical element having a frusto-conical shank at its end remote from its working end, into an assembly comprising pulling means for retaining said shank.

Already available on the market are adapters matched to the arbor, having in their interior an adjustable stop and a cylindrical end-bore into which is insertable the likewise cylindrical milling-cutter shank. However, this does not resolve the problem since, in order to avoid out-of-center defects the cutter should have a frusto-conical shank. Further, because the prior art devices have a pre-adjusting member not attached to the cutter, the adapter must be rigorously matched to the latter, that is to say that an adapter is required for each cutter. The cost of such combinations is consequently high.

Also known are adapters which are permanently fitted into the arbor nose and inside which an intermediate part having a cylindrical outer shape and an inner shape matching the tool shank (frusto-conical, cylindrical, etc.) makes it possible to meet the conditions referred to precedingly.

It is the object of the present invention to overcome the drawbacks of the prior art solutions which, in any event, do not resolve the basic problem, namely the need to meet the following requirements:

precision in the fitting of the tool, with no risk of going out of adjustment as the work proceeds;
no intermediate part, thereby reducing the cost price;
no out-of-center condition;
positive and automatic longitudinal abutment;
automatic fitting of the tool to the machine;
and the ability to change the tool quickly and easily.

In particular, vibration occurring while working the workpiece must not cause the tool to descend.

As in the prior art solutions, an adapter according to this invention includes a case containing the tool shank, a clamp accommodated in the case for clamping the tool shank, and at least one member of adjustable length for adjusting, against stop means, the degree of penetration of the tool shank into the adapter.

In order to resolve the problem in question -the tool shank being of tapering shape- the subject adapter of this invention includes mechanical means for transmitting to the clamp the pulling force applied to the adapter at a point remote from the tool shank orifice, while at the same reversing the direction of this force in order to simultaneously ensure firm application of the tool against said stop means and tightening of the clamp.

This solution overcomes a problem which had hitherto appeared insoluble to many manufacturers.

This is accomplished by reason of the fact that the tightening effect is obtained as the result of a movement which fetches the tool end into pressure contact against a precise fixed stop and that this same movement is caused, as the result of a reversal in direction produced for example by a system of gears and racks, to thrust an elastic member forming part of the adapter against the tapering part to be clamped. As a result, the tool is rigidly and positively restrained in its longitudinal position. It should be noted that in such a system the force which maintains the tool against its stop is virtually equal to the pulling force transmitted by the machine.

The description which follows with reference to the accompanying non-limitative exemplary drawings will give a clear understanding of how the invention can be carried into practice.

In the drawings,

FIGS. 2 and 3 are sectional and plan views showings respectively of a part hereinafter termed "chuck" and which is positioned within the adapter;

FIGS. 4 and 5 are sectional and plan view showings of an end fitting on the tool shank; and FIG. 6 is a sectional view of an alternative adapter embodiment.

Figure 1:
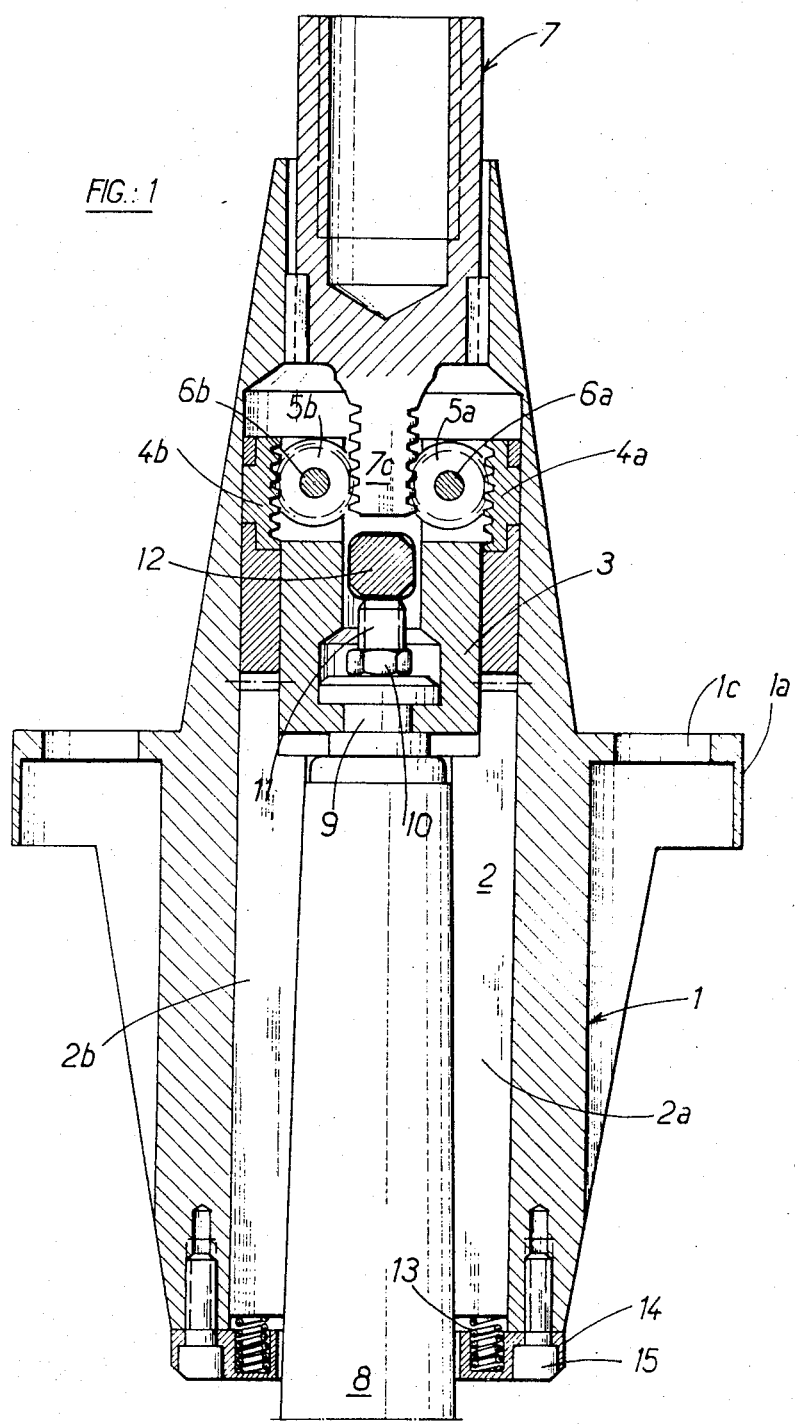
FIG. 1 is a sectional showing of an adapter according to this invention with the milling-cutter shank in position.

The adapter shown in FIG. 1 basically comprises a longish case 1 which is bored out cylindrically to a suitable diameter at its lower end and to a smaller diameter at its upper end. As well known per se, a clamp 2 is slitted longitudinally as at 2a, 2b and is engaged into the case 1. Clamp 2 is hollowed out at its upper end to receive a chuck 3 (shown also in FIGS. 2 and 3) and includes on either side rack-shaped fitted parts 4a, 4b, whereby the clamp 2 is rigidly united with the racks. Two gearwheels 5a, 5b, carried on axles 6a, 6b respectively, mesh with said racks respectively. At its upper end the case 1 has inserted thereinto a restoring-rod holder 7 formed at its upper end with a bored and threaded opening for receiving the restoring-rod (not shown) and terminating at its lower end in a compound rack-shaped portion 7c the cogs of which mesh respectively with gearwheels 5a and 5b.

The case 1 containing the complete mechanism may be rigidly secured to the machine to be equipped and may accordingly include, for example, a circular flange 1a formed with bolt holes 1c and with suitable keying means, correct location being ensured by the tool shank taper.

Further, the shape of the restoring rod which screws into part 7 and constitutes the gripping means provided on the machine transmits the clamping movement and force to the mechanism inside the adapter. The basic parts of the mechanism which reverses the direction of the pull exerted by the restoring rod are the compound rack 7c, the gearwheels 5a, 5b and the racks 4a, 4b rigid with clamp 2.

As shown in FIG. 1, clamp 2 is flared internally with a degree of conicity matching the frusto-conical taper of tool shank 8. Further, the tool 8 carries an end fitting 9 formed with two radial projections 9a, 9b (FIG. 5) adapted to engage into the lower portion of the chuck in order to permit their insertion. End fitting 9 includes a setscrew 10 of adjustable length fitted with a locknut 11. Within chuck 3 and extendable likewise through the clamp and the case is a key 12, which key forms an abutment for set-screw 10 and thereby provides an interconnection means for all the parts during rotation and ensures longitudinal positioning of the tool.

Lastly, four springs 13 urge the clamp upwardly when no tool is inserted. A plate 14 secured by screws 15 to the end of case 1 and supporting the four springs enables the compound to be rendered leaktight if necessary.

The operating principle of the adapter is as follows.

When no tool is inserted into the adapter, the resting configuration of the latter is as follows:

The restoring rod is in its bottommost position, the clamp 2 is in its uppermost position responsively to springs 13 and chuck 3 is in its lower position.

The procedure for fitting a tool when the adapter is in its inoperative configuration is to engage tool shank 8 equipped with its end fitting 9 into clamp 2, the part 11 having been adjusted beforehand to the required length and mounted on the end fitting, and thereafter to engage the latter by means of its flats 9c, 9d into the opening 3a in chuck 3, whereupon a quarter-turn causes chuck 3 to engage the end fitting with its projections 9a, 9b. This turning motion is limited by pins 17 which further ensure rotation in the right direction (to the left).

With clamp 2 serving as a temporary reaction point by virtue of springs 13 (so long as the pulling force required is small), the gearwheels 5a, 5b are driven by the restoring rod and roll along the racks 4a, 4b and cause chuck 3 and the tool to rise until set-screw 11 contacts key 12. At this point chuck 3 can rise no further and becomes a fixed reaction point, whereupon the axles of gearwheels 5a, 5b become stationary and gearwheels 5a, 5b drive clamp 2 downwardly until the conical surfaces of the clamp and the tool come into contact. At this point, the fact that the clamp is split into sectors causes a gripping effect which binds the tool cone rigidly to case 1.

This binding force is directly proportional to the pulling force exerted on the restoring rod. Throughout the movement, set-screw 11 acts as the reaction point and the tool is maintained in pressure contact against key 12 with a force which, to within frictional losses, is equal to the pulling force exerted on the restoring rod.

To release the tool, the machine exerts a pushing force on the restoring rod. With the tool clamped in position, chuck 3 acts as the reaction point. In response to the restoring rod, gearwheels 5a, 5b tend to rotate and to raise the clamp, thereby releasing the assembly, the clamp thereafter continuing to rise under the urge of springs 13. A quarter-turn will then release the tool from the chuck.

Reference is lastly had to FIG. 6 for an alternative adapter embodiment in which like parts or parts performing like functions to those in the embodiment of FIG. 1 bear like reference numerals.

In this alternative embodiment the relative positions of parts 7 and 2 have been changed for considerations of bulk, which modifies the shape of chuck 3 and reverses the positions of the gearwheels in relation to the tool attachment point. In this case the key 12 is no longer interconnected with case 1, and it is the spindle taper which positions the key.

It goes without saying that many changes could be made in the exemplary embodiments hereinbefore described, without departing from the scope of the invention. In particular, it will be appreciated that while the end fitting 9 has been described with reference to FIGS. 1, 4 and 5 as being adapted by virtue of its shape to a milling-cutter rotating in a given direction (to the left), it could be replaced by an equivalent symmetrical part for a milling-cutter rotating in the opposite direction.

I claim:

1. A tool adapter, more particularly for tools of the milling-cutter type having a machining end and a shank which is capable of engaging into the adapter and tapers off toward its engaging end, said adapter including clamping means for gripping the shank, a stop and at least one removable part of adjustable length, an enveloping case for accommodating the clamping means, the stop and the adjustable part, said adapter further including mechanical transmission means for transmitting to the clamping means a pulling force which causes a gripping effect by the clamping means.

2. A tool adapter according to claim 1, wherein the part of adjustable length is positioned in the case against the stop, which forms a separate part, and the tool shank fits into the clamping means against the adjustable part, and wherein said transmission means constitute an intermediate mechanical drive for reversing the direction of the force transmitted to the clamping means and derived from the pulling force applied to the adapter at a point on the end remote from the tool shank orifice location in the adapter whereby to simultaneously apply the tool firmly against said stop and cause a gripping effect by the clamping means.

3. A tool adapter according to claim 1, wherein the clamping means is a clamp formed with longitudinal splits therein and wherein the pulling force is transmitted thereto by drive means comprising in combination a rack fast with the pulling member, a gearwheel meshing with said rack, and a second rack fast with the clamp and meshing with the gearwheel.

4. A tool adapter according to claim 3, including a member for coupling it to a rod to which the pulling force is applied, said member being fast with a bar formed with rack teeth on two opposite sides and positioned between the two gearwheels whereby to mesh therewith, the clamp having rack-forming surfaces thereon for meshing with said gearwheels on the outside.

5. A tool adapter according to claim 3, wherein the clamp has rack-forming portions rigid therewith for meshing with said gearwheels on the inside.

6. A tool adapter according to claim 1 for a tool having a substantially frusto-conically shaped shank, wherein the surrounding case has a cylindrical internal shape at its tool-receiving end and the clamp has a shape which is cylindrical externally and flares out towards its end internally.

* * * * *